Jan. 13, 1959     W. J. WALKER ET AL     2,868,448
APPARATUS FOR THE DETERMINATION OF POLYNOMIAL FUNCTIONS
AND THE SOLUTION OF ALGEBRAIC EQUATIONS
Filed March 4, 1953                         4 Sheets-Sheet 1

W. J. WALKER,
R. Mc. WALKER,
A. I. ARCHER, AND
T. O'D. DUGGAN

INVENTORS

BY Wenderoth, Lind & Ponack

ATTORNEYS

Jan. 13, 1959　　W. J. WALKER ET AL　　2,868,448
APPARATUS FOR THE DETERMINATION OF POLYNOMIAL FUNCTIONS
AND THE SOLUTION OF ALGEBRAIC EQUATIONS
Filed March 4, 1953　　4 Sheets-Sheet 2

W. J. WALKER,
R. Mc. WALKER,
A. I. ARCHER, AND
T. O'D. DUGGAN
INVENTORS

BY Wenderoth, Lind & Ponack
ATTORNEYS

Jan. 13, 1959     W. J. WALKER ET AL     2,868,448
APPARATUS FOR THE DETERMINATION OF POLYNOMIAL FUNCTIONS
AND THE SOLUTION OF ALGEBRAIC EQUATIONS
Filed March 4, 1953                                    4 Sheets-Sheet 3
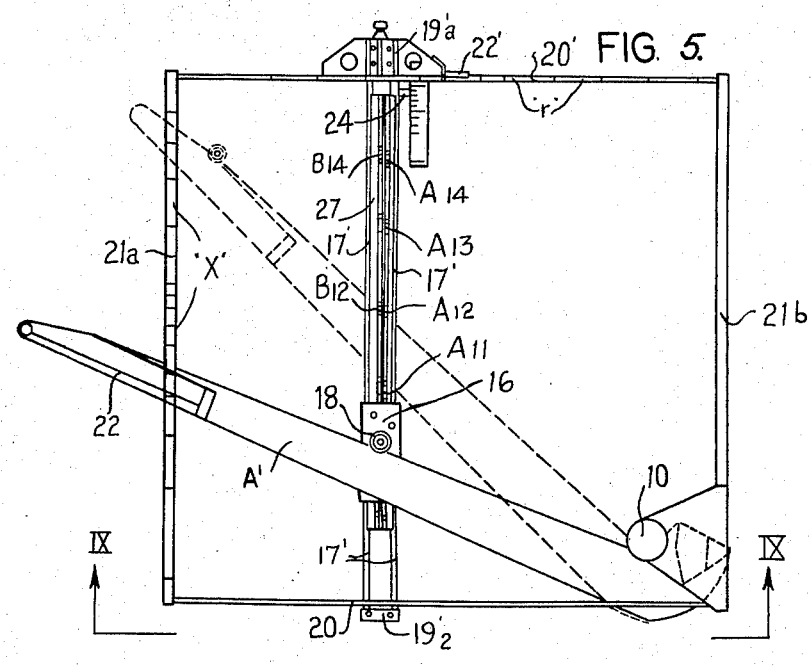
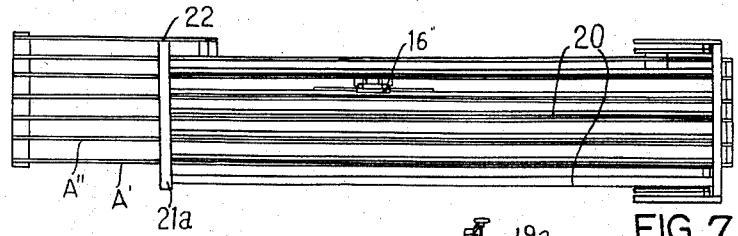
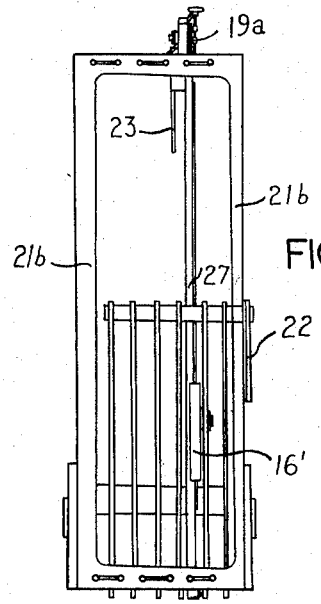
W.J. WALKER,
R.Mc.WALKER,
A.I. ARCHER, AND
T. O'D. DUGGAN
    INVENTORS
BY Wenderoth, Lind & Ponack
           ATTORNEYS

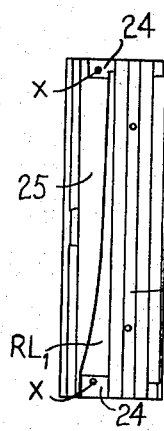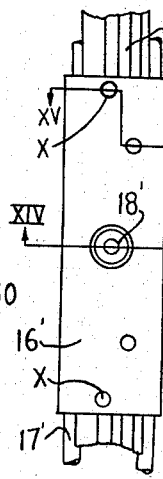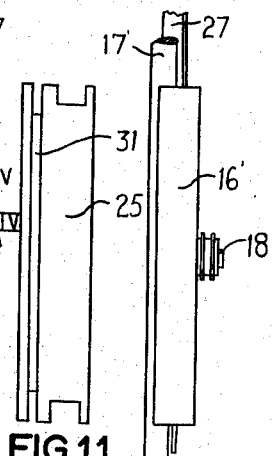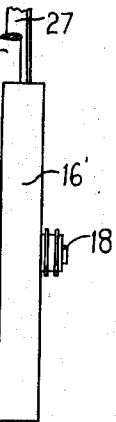
FIG. 10.  FIG. 8.  FIG. 11.  FIG. 9.
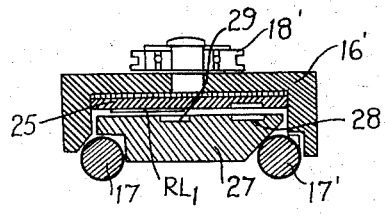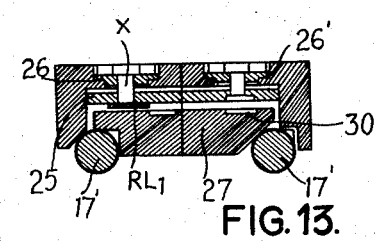
FIG. 12.  FIG. 13.
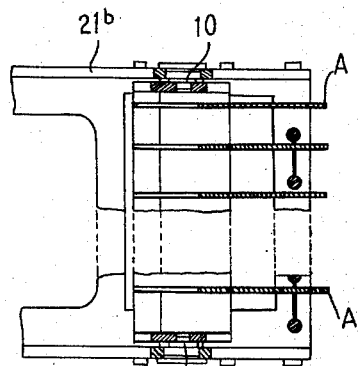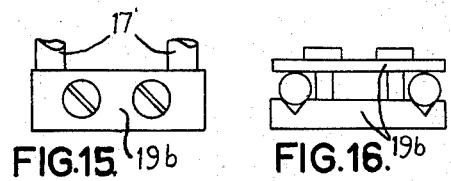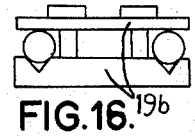
FIG. 15.  FIG. 16.
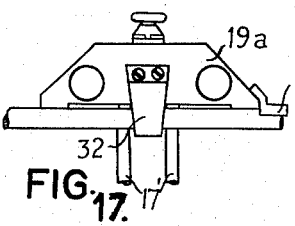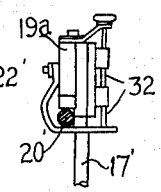
FIG. 14.  FIG. 17.  FIG. 18.
W. J. WALKER, R. Mc. WALKER,
T. O'D. DUGGAN, AND A. I. ARCHER
INVENTORS
BY *Wenderoth, Lind & Ponack*
ATTORNEYS

United States Patent Office 2,868,448
Patented Jan. 13, 1959

2,868,448

APPARATUS FOR THE DETERMINATION OF POLYNOMIAL FUNCTIONS AND THE SOLUTION OF ALGEBRAIC EQUATIONS

William J. Walker, Johannesburg, Transvaal, Roland M. Walker, Rondebosch, Cape Province, and Terence O'D. Duggan and Alva Izak Archer, Johannesburg, Transvaal, Union of South Africa Application March 4, 1953, Serial No. 340,304

2 Claims. (Cl. 235—61)

This invention relates to mathematical processes for or including the calculation of powers of numbers, the determination of the value of polynomial functions and the solution of algebraic equations, and it provides apparatus for carrying out such processes and calculations, which, more especially when powers higher than the cube and/or fractional powers are involved, call in the ordinary way for tedious or laborious calculation work leading often to only approximate answers, or which have defeated all but the most highly developed of the calculating apparatus or machines available up to now.

The invention provides calculating apparatus for the purposes aforesaid, based, for its use or operation, upon a known mathematical process or processes, capable, it has been found, of performance by devices operated manually, mechanically, electrically, electronically or by combination of these means, which devices may be included, if desired, in operative association with known apparatus or calculating machines to extend their hitherto limited utility.

The essential purpose of the invention is more particularly to provide calculating apparatus whereby powers of numbers, such as $x^r$ ($x$ and $r$ being any real numbers whatever, positive or negative) may be readily calculated, the value of polynomial functions readily determined and algebraic equations readily solved.

In the accompanying drawings, Figure 1 is a simple diagram for assisting in the explanation of the main principle underlying the invention; the remaining figures are described later in this specification.

The diagram of Figure 1 is assumed to be drawn with a linear scale for $r$ plotted along the horizontal axis as shown. Any line AB intersecting both axes will have for its intercept on the vertical axis, the value $-mr$ as measured on a linear scale, where $m$ is the slope of the line. If the slope $m$ is taken as $(-\log_{10}x)$, positive values of $x$ only being considered, the intercept on the vertical axis will be $\log_{10}x^r$. If, however, the scale on the vertical axis is a logarithmic scale, values of $x^r$ may be read off directly on the vertical axis.

A second principle of the invention provides a method of multiplication of $x^r$ to obtain quantity $a_r x^r$.

Referring again to Figure 1, if the point B be moved vertically a distance $BE = a_r$ as measured on the logarithmic scale previously mentioned, and a straight line CD be drawn therethrough and parallel to AB, the intercept on the vertical axis will be $\log x^r + \log a_r$ as measured on the linear scale. This intercept read on the logarithmic scale will therefore be $a_r x^r$, where $r$ may have any value, positive, negative, integral or fractional.

These principles may also be applied to the determination of the value of functions of the form $f(x)$ where $f(x)$ is given by $$a_n x^n + a_{n-1} x^{n-1} + \ldots a_r x^r + \ldots a_0$$

and also to the solution of $f(x) = 0$.

N. B. $f(x)$ may also have the form $$a_a x^\alpha + a_b x^\beta + a_c x^\gamma \ldots$$

where $\alpha$, $\beta$, $\gamma$ etc. may have any values, fractional or integral, preferably arranged, of course, in ascending or descending scale.

All that is necessary in such cases, is to determine the values of $x^r$ for each term as in the foregoing method, and then to multiply each such term by its corresponding coefficient $a_r$. The algebraic summation of the product terms so obtained will then give the value of $f(x)$. This process may be carried out for all real values of $x$ by varying the slope of the lines drawn through the respective values of $r$.

One method of doing this is as follows. Suppose a series of points $(r, \log a_r)$ or $(r, a_r)$ using the linear or logarithmic scales respectively on the vertical axis, be plotted on the diagram, and a set of parallel lines be drawn therethrough, the summation of the intercepts as measured on the logarithmic scale, of these parallel lines will give the value of $f(x)$ for the value of $x$ corresponding to the slope of the set of parallel lines.

As $x$ varies from 0 to $\infty$, and $(-\log_{10}x)$ varies from $+\infty$ to $-\infty$, the slope of the set of parallel lines varies, giving corresponding sets of intercepts on the vertical axis $r = 0$. The location of the real positive roots of the equation $f(x) = 0$, is equivalent to finding the slopes of those sets of parallel lines for which the algebraic sum of their intercepts on the logarithmic scale is zero. Further, as the values of $f(x)$, where $f(x)$ is writtten $$a_n x^n + a_{n-1} x^{n-1} + \ldots a_r x^r + \ldots a_0$$

$n$ being integral, for all negative values of $x$ are the same as the values of $f(-x)$ for all positive values of $(-x)$, the determination of $f(-x)$ for all positive values of $(-x)$ will, correspondingly, give the values of $f(x)$ for all negative values of $x$. Hence, $f(x)$ can thus be determined for all real values of $x$. In particular the real negative roots of $f(x) = 0$, are determined by determining the real positive roots of $f(-x) = 0$. It should be noted that the configuration of the points $(r, \log_{10} a_r)$ or $(r, a_r)$ as the case may be, for $f(-x)$ is the same as for $f(x)$, the points corresponding to odd indices having, however, their relevant signs associated with them.

The third principle involved is that the summation of the intercepts of the set of parallel lines on a vertical axis through any value or $r$, may be used to determine the value of $f(x)$ for any value of $x$, and also to determine the real roots of $f(x) = 0$. This may be seen from the following analysis.

The intercept, on the linear scale, on the vertical axis through $r = b$, for example, is given by $\log_{10} a_r - m(r-b)$, or $\log_{10} a_r x^r - b \log_{10} x$, which may be written $$\log_{10} \frac{a_r x^r}{x^b}$$

Thus, the intercepts on the linear scale of the vertical axis $r = b$, of the set of parallel lines are equal to the logarithms of the corresponding magnitudes $$\frac{a_r x^r}{x^b}$$

so that $$\frac{a_r x^r}{x^b}$$

is read directly on the logarithmic scale. Evidently, by summing algebraically the terms $$\frac{a_r x^r}{x^b}$$

for each set, the corresponding value of $$\frac{f(x)}{x^b}$$

can be determined, and so $f(x)$ determined for all positive values of $x$. Similarly $f(-x)$ may be determined for all positive values of $(-x)$ so that $f(x)$ may be determined for all real values of $x$. Also, since $$\frac{f(x)}{x^b} = 0$$

when $f(x)=0$, the real roots, positive and negative, will be given whenever the algebraic summation becomes zero for the intercepts on any vertical axis.

If, therefore, the slope of the set of parallel lines becomes such that some of the lines do not intersect the vertical axis $r=0$, the function $f(x)$ may still be determined and its roots may still be found by summing the intercepts on any convenient vertical axis $r=b$, so chosen that all the parallel lines do intersect it.

The invention may be stated broadly to consist in a device for the purposes set forth wherein the term or terms of any given polynomial functions are severally located, as hereinbefore described for graphical plotting, but by any means, whether mechanically, electrically or other known methods in relation to a pair of axes having a common origin and respectively scaled linearly and logarithmically, and the intercept or intercepts as the case may be on the logarithmically scaled axis, of straight parallel lines, rods, electric or light beams as the case may be, passing through the respective located points, at a slope corresponding to the negative value of the logarithm of the unknown, provide(s) value(s) for the term or terms. Algebraic summation of the values of the terms will determine the value of the function.

The device may alternatively comprise an electro-mechanical contrivance functionally the equivalent of the device or contrivance set forth in the immediately preceding paragraphs and wherein the intercept readings are evaluated in terms of any measurable electrical phenomenon, e. g. voltage, current, charge, capacity, with the aid of synchronically movable electric conductors forming parts of identical and similarly-indexed electrical systems having logarithmic output characteristics, with metering means in the several systems.

The invention also consists in specific embodiments of devices or contrivances as aforesaid, hereinafter given by way of example.

Referring again to the accompanying drawings.

Figure 4:
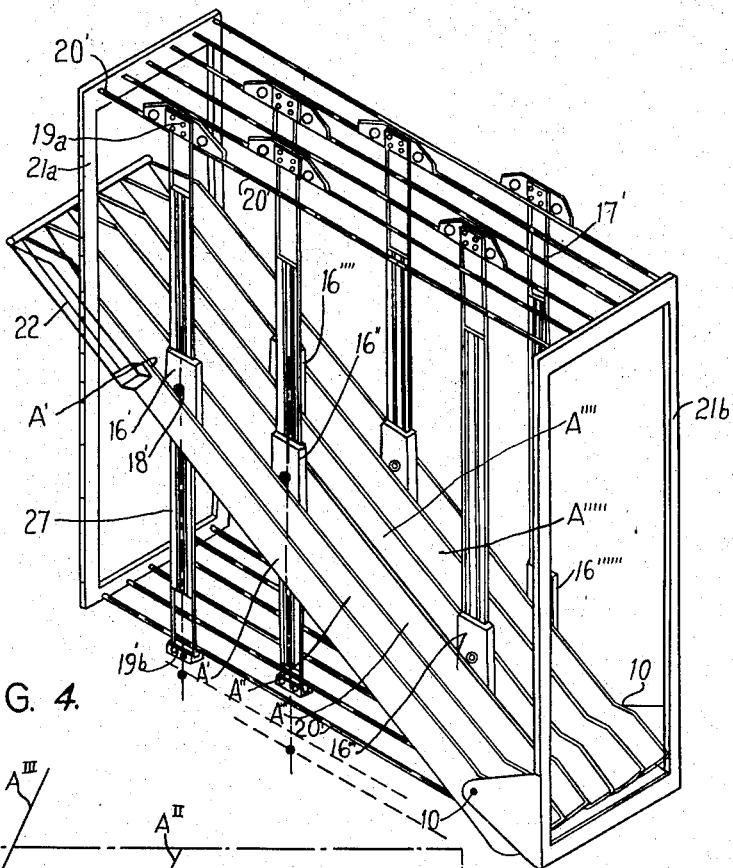
Figure 4 is a semi-diagrammatic perspective side view of a convenient and preferred construction of apparatus operable in accordance with the principles outlined with reference to Figure 4 and enlarged upon and modified in the description with reference to Figure 5, all wiring being omitted to avoid confusion of the figure.

4. Figure 5 is a side elevation corresponding to Figure 4;

Figure 6 is an end elevation corresponding to Figure 4;

Figure 7 is an inverted plan corresponding to Figure 4;

Figures 8 and 9 are fragmentary side and end elevations respectively of one of the logarithmic resistance or potentiometer carriers included in the construction of Figures 4 to 7;

Figure 10 is an interior elevation of the carrier showing a resistance and contacts;

Figure 11 is an elevation of an insulative inner member included in the resistance carrier;

Figure 12 is a cross-section on the line XIV—XIV of Figure 10;

Figure 13 is a cross-section on the line XV—XV of Figure 10;

Figure 14 is a fragmentary inverted plan of the arm pivot system;

Figures 15 and 16 are detail views of lower end saddles for upright potentiometer carrier guides; and Figures 17 and 18 are detail views of the corresponding upper end saddles.

Figure 2:
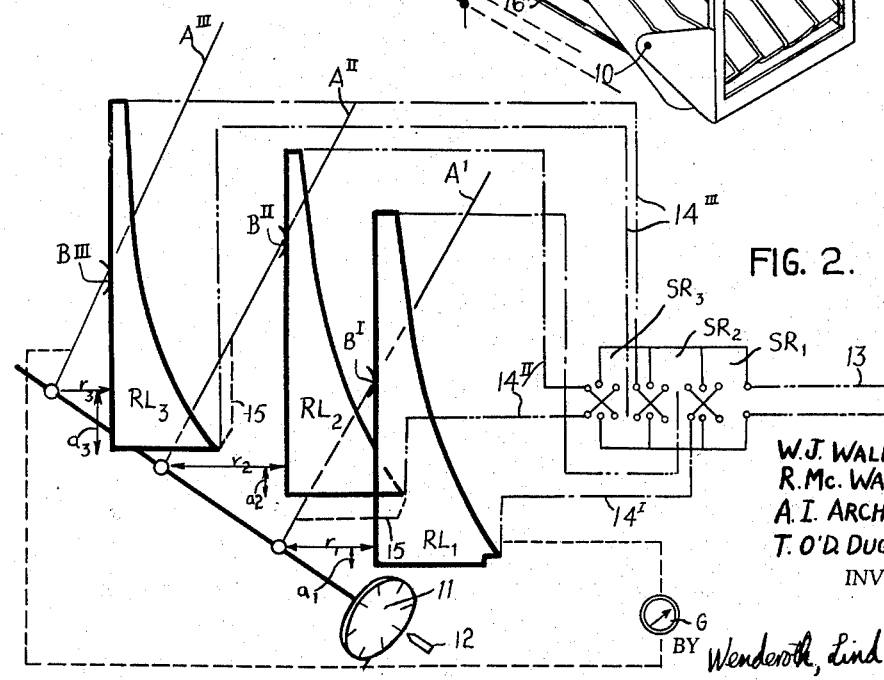
Figure 2 is a diagrammatic perspective illustration of a convenient electrical embodiment of the invention employing logarithmic resistances.

In a preferred form of device embodying the present invention and illustrated only diagrammatically in Figure 2 a number of logarithmic resistances $RL_1$, $RL_2$ $RL_3$ preferably of flat form and each having one straight edge, are mounted side by side in a row or in a laminar arrangement with their flat faces parallel to each other, and in some suitable form of casing or frame, in such a way that their straight edges are all parallel to each other, and also in such a way that they are capable of being moved, as explained below, by any well-known mechanical method, whilst maintaining their straight edges parallel to each other throughout such motion.

Each resistance has associated with it two rectangular axes, one of which, the $a_r$ axis with $a_r$ values on a logarithmic scale, lies along the straight edge of the resistance, and the other, the $r$ axis, with $r$ values on a linear scale, set at right angles thereto. These axes have their origin at the point $(a_r=1, r=0)$, and correspond to the horizontal and vertical axes respectively in the form of the device previously described.

Also, each resistance is arranged so that the value of the resistance along its straight edge varies logarithmically.

A set of straight arms $A'$, $A''$, $A'''$, one arm to each resistance, and each fixed to a common spindle 10 mounted in the casing or frame, is arranged to be rotated by the spindle about an axis passing in front of the straight edges of the resistances and at right angles thereto, so that each of these arms remains coplanar with the others in all positions and all rotated through equal angles. During rotation, contacts $B'$, $B''$, $B'''$ operated by these arms, e. g. borne slidably along them, wipe over the straight edges of the corresponding resistances and make electrical contact therewith. The centre of rotation of each arm (occurring in this example in the spindle 10) is made to correspond with respect to its resistance $RL_1$ etc., as described later, to one of the points marked on the section area of the diagram already described with reference to Figure 1, and the arms themselves are made to correspond to the set of parallel lines in that diagram. The spindle carrying the arms is driven by means of gears or any other suitable mechanical means, the spindle having attached to it a drum or the like 11 suitably inscribed with values of "$x$" readable against a fixed pointer 12.

In addition each of the resistances may be moved bodily and independently of the others, by any suitable mechanical means, relative to each of its two associated axes, the extent of the movements being indicated with the aid of suitable scales and corresponding to particular values of $a$ and $r$, shown for example as displacements $a_1$, $a_2$, $a_3$ and $r_1$, $r_2$, $r_3$.

Each resistance is supplied with an electric current, as $RL_1$, $RL_2$, $RL_3$ via leads 14', 14'', 14''' from a source 13, through a reversing switch as $SR_1$, provision being made for equalising all the currents. Each arm (including its contact) is electrically connected as by leads 15 to the beginning of the next succeeding resistance, except the last arm of the series which is connected to the beginning of the first resistance through a galvanometer or other suitable indicating or recording instrument, which records the algebraic sum of the potential differences between the beginning of each resistance and its associated arm contact $B'$, $B''$, $B'''$.

To use the device as above described, each resistance is movable in the directions of its associated axes, into a position such that the centre of rotation of its associated arm, relative to those axes, corresponds to the co-ordinates $(r, a_r)$ for one of the terms of $f(x)$. Where negative terms occur the direction of the current through the particular resistances on which those terms are set, is reversed by means of the reversing switches already mentioned. The arms may now be collectively rotated, and for each value of $x$ indicated on the side of the drum or the like on the spindle, the value of $f(x)$ is read on the aforementioned galvanometer or other indicating or recording instrument suitably calibrated for the purpose.

Figure 1:
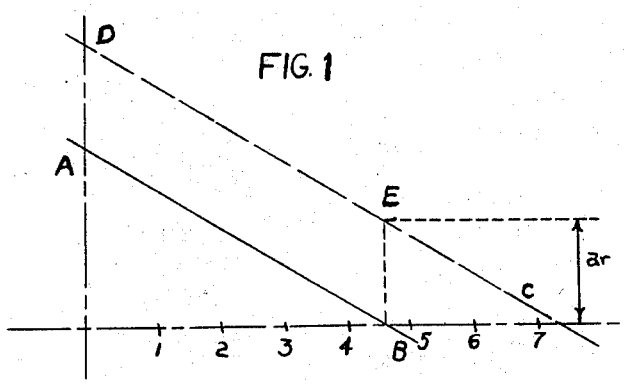

In this way, each parallel arm with its associated logarithmic resistor corresponds to the plotting of the point on the diagram, Fig. 1. This may be seen as follows: The logarithmic scale is given by the logarithmic resistor and the logarithmically scaled axis is the vertical line passing through the straight edge of said resistor, the axis of rotation of the arm corresponds to the plotted point itself, while the horizontal distance of said axis of rotation from the aforementioned vertical axis gives the quantity $r$. Hence, in this electro-mechanical analogue of the mathematical principle, the point $a_rx^r$ is plotted by moving the axes relative to the point, an operation obviously equivalent to plotting the point relative to fixed axes.

Each term $a_rx^r$ is associated with one arm and its related logarithmic resistor. Reference to Fig. 4 shows the axes sketched in for three terms, with the coordinates $a$ and $r$ clearly shown in each case.

Real positive roots of $f(x)$ are obtainable from the values of $x$ for which the galvanometer or other such instrument reading is zero.

The reversing switches are next operated on those resistances on which terms having odd indices are set, and the process repeated. The real positive roots of $f(-x)$ are now obtained, corresponding to the real negative roots of $f(x)$.

The device above described may be modified, and incidentally simplified in the mechanical sense by arranging for each resistance being moved only in the direction parallel to the $r$ axis (i. e. horizontal in Figure 2) so that the position of the centre of rotation of its associated arm corresponds to the co-ordinates $(r, 1)$, for one of the terms of $f(x)$. The currents which pass through the several resistances are then individually controlled to be such that they are proportional in each case to the corresponding value of $a_r$. The potential difference between the beginning of each resistance and its associated arm will then correspond to $a_rx^r$ and these potential differences may be algebraically summed as above described. This method may obviously also be employed in this way to determine readily the value of $x^r$, the galvanometer or the like which is used being calibrated to read correctly for a given current passing through a resistance.

Figure 3:
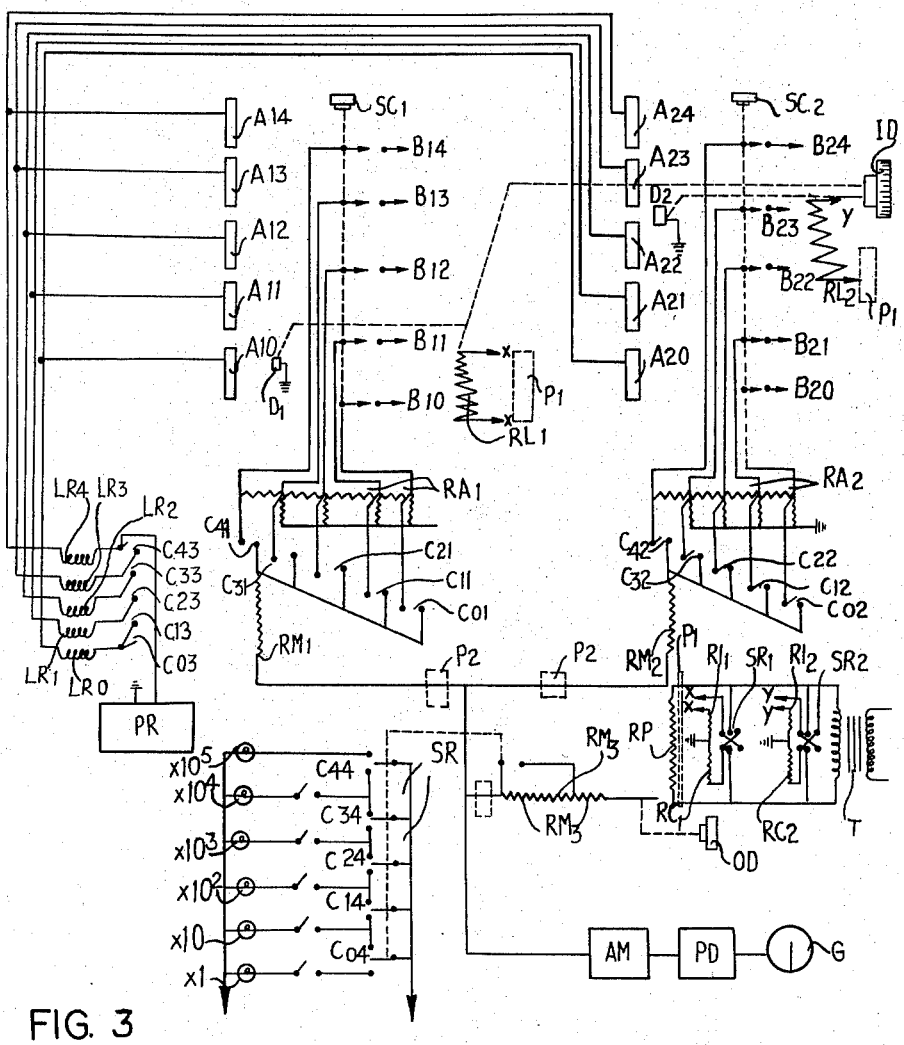
Figure 3 is a schematic diagram of a further electrical embodiment of the invention wherein, inter alia, logarithmic resistances functioning in an equivalent manner to those in Figure 4, are extended in their range through several decades.

The following is a further form of device embodying the present invention. The purpose of this device, see Figure 3, is to provide for extending the range of the electrical computer without the necessity for large logarithmic resistors covering a range of several decades and such as would be difficult or even impossible to construct and/or would otherwise be unsuitable. This extension is accomplished generally by means of suitably connected resistors, relays and sundry other components of appropriate design and proportions as hereinafter explained.

An alternating current is impressed on the logarithmic resistors, as $RL_1$ and $RL_2$ (of which two only are shown for clarity of illustration), by means of the transformer T, and through the reversing switches $SR_1$ and $SR_2$, the current-equalising resistors $RI_1$, $RI_2$ and $RC_1$, $RC_2$, and the connections indicated by the references $x$, $x$, and $y$, $y$ at the ends of the resistors $RL_1$ and $RL_2$, and repeated near the resistors $RI_1$, $RI_2$. When, on operating the input dial ID, the appropriate motion is imparted to the logarithmic resistors, they move across the respective sets of contacts $B_{10}$—$B_{11}$, $B_{11}$—$B_{12}$ etc. and $B_{20}$—$B_{21}$, $B_{21}$—$B_{22}$ etc. The physical extent of the logarithmic resistors is somewhat greater than one decade, while the contacts of any one set are spaced precisely one decade apart. Hence if, for example, the resistor $RL_2$ makes contact with $B_{22}$ and $B_{23}$ simultaneously, the potential of $B_{23}$ will be precisely ten times greater than that of $B_{22}$.

Currents tapped off from the logarithmic resistors are led through the selector switches $SC_1$ and $SC_2$, whose purpose is to be described later, to the decade attenuators $RA_1$ and $RA_2$. These attenuate a current proceeding from right to left in the diagram by a factor of ten per section, and the resistances of their shunt and series elements are large relative to the resistance of $RL_1$ or $RL_2$. Corresponding points on each of the attenuators are connected individually to normally open contacts on the same relay spring set, e. g. $C_{31}$ and $C_{32}$, five relays being shown in the drawing.

The currents originally derived from the logarithmic resistors are now mixed, by means of $RM_1$, $RM_2$, and $RM_3$, with the output from a calibrated potentiometer, RP, controlled by the output dial OD. Algebraic summation takes place, and an unbalanced potential is indicated by means of the null detector comprising the amplifier AM, phase-sensitive detector PD, and galvanometer G.

The relay contacts $C_{01}$, $C_{02}$ to $C_{41}$, $C_{42}$, are controlled by relay coils $LR_0$ to $LR_4$, the latter being energised through sliding contacts $D_1$ and $D_2$, and sets of stationary contacts $A_{10}$, etc., and $A_{20}$, etc.; the contacts $D_1$ and $D_2$ being mechanically coupled to their corresponding logarithmic resistors. In addition, the relay coils are connected to the relay power supply PR through normally closed contacts, as $C_{03}$ to $C_{43}$, on the relay spring sets in such a manner that operation of a relay in the series $LR_4, \ldots LR_0$ causes the coil circuits of all subsequent relays in the series to be opened.

Signal lamps $X10^5$, $X10^4$, $X10^3$, $X10^2$, $X10$, $X1$, connected through normally open contacts as $C_{04}$ to $C_{44}$ of the relay spring sets, and through the multipole switch SR, indicate the power of ten to be applied to the reading shown on the output dial. The switch SR removes a portion $RM'_3$ of the mixing resistor $RM_3$ causing the current injected by RP to be multiplied by a factor of ten. This factor is indicated automatically on the signal lamps.

In the operation of this system assuming conditions exist as shown in the drawing; since the contact pairs $D_1/A_{10}$, $D_2/A_{22}$, $D_2/A_{23}$ are closed, only relay coil $LR_3$ will be energised, closing $C_{31}$, $C_{32}$, $C_{34}$, and opening $C_{33}$. Neglecting for the present the effect and purpose of $SC_1$ and $SC_2$, the potential, say $e_{10}$, due to $RL_1$ on $B_{10}$ will evidently be attenuated by a factor of $10^3$ before being applied to $RM_1$. $RL_2$ makes contact with both $B_{22}$ and $B_{23}$ but, since the values of the shunt and series elements of the attenuators are made large compared with the resistance of $RL_2$, the effect of $B_{22}$ is negligible, and only the potential, say $e_{23}$, of $B_{23}$, applied directly to $RM_2$, is effective. A potential proportional to the sum $e_{23}+10^{-3}e_{10}$ is measured by means of RP and the null detecting circuit.

Returning now to the description of Figure 3, the reversing switches $SR_1$, $SR_2$ serve to determine the signs of the potentials, and therefore also of the corresponding terms in the polynomial. Since the basic range of the logarithmic resistors should, in terms of the independent variable, commence from unity, the resistors $RI_1$ and $RI_2$ are adjusted to yield a potential difference corresponding to unity as measured on the output dial.

It has been shown that an appropriate displacement of the pivot point of any one of the arms carrying a logarithmic resistor or, alternatively, an equivalent displacement of the contact point, has the effect of multiplying the corresponding term in the polynomial by a constant factor. It follows that translation of the sets of contacts $B_{10}$ to $B_{14}$ or $B_{20}$ to $B_{24}$ has an identical effect. In the computer of which essential parts will be described hereinafter, these sets of contacts are capable of continuous mechanical translation over a range of slightly more than one decade. Step-wise translation over complete decades is simulated electrically by means of the selector switches such as $SC_1$ and $SC_2$ which switch the leads of contacts B to other contacts B. These two facilities in combination allow continuous coverage of the entire range.

Referring to Figures 4 to 7, the corresponding parts are given as far as possible the corresponding references to those employed in Figures 2 and 3. The resistances as $RL_1$ are contained in crosshead-like carriers as 16' movable up and down pairs of parallel upright guide rods as 17' in response to a drive through rollers or the like as 18' on the sides of the carriers from the upper straight edges as $A_1'$ of the arms as A'. The rod pairs as 17' are fixed in upper and lower saddles as $19'_a$ and $19'_b$ themselves slidable along horizontally arranged guide rods as 20'. The arms A' A'' etc. are fixed in parallelism with one another for raising and lowering angularly in the framework, which latter is completed by the open end structures 21a, 21b, about a common axis at 10 corresponding to the axis of the spindle 10 in Figure 4.

The end structure 21a is logarithmically scaled (for the "x" scale) as shown to yield directly values for the function x, with the aid of a cursor 22 on one of the arms A'. The several upper rods as 20' guiding and positioning the respective upright rod pairs as 17' are respectively scaled linearly (for the "r" scale) as shown for setting the rod pairs, with the aid of an index 22' on the saddle 19'a, as required. Depending from each upper saddle is a logarithmically graduated "co-efficient" scale 23 (for the "a" scale) co-operating with a further index 24 attached to and raisable and lowerable with a contact-carrying member 27 of the associated carrier as 16', as hereinafter described.

The detail construction of the saddle parts and arm pivot system is evident from Figures 14 to 18, which show a simply operated plunger-releasable spring clamp means 32 for the saddles as 19'a and the necessarily robust interconnection of the arms in a proportionately robust construction of the pivot system providing the axis 10.

The construction of the arm pivot system is best shown in Fig. 16 wherein the arms as $A_1$ are connected together about alternate spacer members 10a and between end plate members 10b from the outsides of which stub shafts project into antifriction bearings supported by side bracket plates 10c and providing the pivot 10.

The lower saddles as 19'b, as clear from Figs. 17 and 18, are essentially a pair of plates or the like clamped across the bottom ends of the guide rod 17' by screws, the thicker of the two plates engaging the underside of the lower guide rod 20' as shown in Fig. 6.

The upper saddle as 19'a, best shown in Figs. 19 and 20, is a plate assembly fixed across the upper ends of the rods 17' and one of the plates engaging by its lower surface along the top of the upper guide rod 20' and carrying a bowed spring 32 which ordinarily bears upwardly as a friction brake against the underside of the rod 20' but can readily be released by depressing its tail by a plunger 32' against the upward resilient return action of a leaf spring 32'' mounted on the top of the saddle.

In the construction shown reliance is placed upon gravity for holding each resistance carrier into effective co-operating engagement with its respective arm, but this action may be assisted by loading the carriers downwardly by spring or other such means and/or providing a positive drive between the parts in both upward and downward directions.

Referring particularly to Figures 8 to 13 for a more detailed description of the resistance carriers as 16', the resistance $RL_1$ is fixed by end pieces 24 against one side of an insulative base 25 (see Figure 11) inside the carrier body and connections x, x from its ends are made through insulators 26 clearly shown in Figure 13. Another insulative member 27 in the form of a slide is slidable under guidance of the rods 17' through and independently of the carrier, and it contains along parallel grooves 28 and 29 in its face presented towards the resistance-bearing base 25, series of equispaced contacts $B_{10-14}$, and equispaced contacts $A_{10-14}$ traversable respectively by the straight margin of the resistance $RL_1$ and by a contact bar 30 fixed in a groove 31 formed along the member 25 parallel with the resistance edge, connections from which bar are taken through further insulators 26' shown in Figure 13. The contact-carrying slide member 27 also carries the index 24 at its upper end for setting, against the co-efficient scale 23, the height of the respective contact series, of which $A_{10-14}$ are connected (see Figure 3) to the relays as $LR_{0-4}$ and $B_{10-14}$ are connected to the network as $RA_1$. The individual sections of the apparatus, of which sections six are shown, each being identical with that above described, are wired and interwired to conform with Figure 3, and associated with the necessary extraneous apparatus generally for functioning as described in detail with reference to the whole of that figure.

A further modification includes provision for the introduction of complex numbers. Phase-shifting devices (not novel per se in computers of this type) are introduced into each circuit representing a term of the polynomial, and they may, in accordance with this invention, be placed before the logarithmic resistors as at $P_1$ (Figure 3) for low impedance shifters, or in the leads to or from the mixing resistors, as at $P_2$ for high impedance shifters, depending on the impedance level at which they are to operate. If then, it be supposed that the rate of change of phase due to the phase-shifting device associated with any one term is directly proportional to the index of the independent variable in that term, it follows directly that the magnitude and phase displacement of the signal, which is the sum of the voltages representing all the terms, will, when measured with reference to the signal representing the independent variable, yield correctly the modulus and amplitude of the independent variable. The computer may be modified to make such a comparison by inserting a phase-shifting device in the potentiometer (RP) circuit, and adjusting both magnitude and phase controls in this circuit to obtain a null.

What is claimed is:

1. Electro-mechanical computing apparatus comprising a series of logarithmic resistances of similar construction each including one straight edge, which resistances are mounted in parallelism with one another and with their straight edges parallel, each of the resistances mounted for movement bodily and independently of the others relative to each of two associated axes, one of which axes coincides with the straight edge of the resistance and the other at right angles thereto, means for moving each resistance independently relative to the others while maintaining the edge parallelism, a set of arms, a common spindle on which said set of arms is mounted having an axis passing the straight edges of the resistances normally thereto, one arm being provided for each resistance, a plurality of electrical contacts one movable by each of said arms and each contacting the straight edge of one of said resistances to wipe in electrical contact over the said straight edge, and scale and pointer means connected to said spindle, means for supplying an electric current with reversible polarity to each resistance, means for equalising the current fed to the respective resistances, means for algebraic summation of potential differences, means connecting each contact electrically to the beginning of the succeeding resistance of the said series and the last arm of the series to the beginning of the first resistance of the series through said algebraic summation means for measuring the potential differences occurring between the beginning of each resistance and its associated arm contact, and scales associated with the aforesaid axes of movement of each resistance.

2. Electro-mechanical computing apparatus comprising a series of logarithmic resistances of similar construction each including one straight edge, which resistances are mounted in parallelism with one another and with their straight edges parallel, each of the resistances mounted for movement bodily and independently of the others in relation to the arm spindle axis only in a direction transversely of the straight edges of the resistances engaged by the arm contacts, means for moving each resistance independently relative to the others while maintaining the edge parallelism, a set of arms, a common spindle on which said set of arms is mounted having an axis passing the straight edges of the resistances normally thereto, one arm being provided for each resistance, a plurality of electrical contacts one movable by each of said arms and each contacting the straight edge of one of said resistances to wipe in electrical contact over the said straight edge, and scale and pointer means connected to said spindle, means for supplying an electric current with reversible polarity to each resistance, means for individually adjusting the current to each resistance, means for algebraic summation of potential differences, means connecting each contact electrically to the beginning of the succeeding resistance of the said series and the last arm of the series to the beginning of the first resistance of the series through said algebraic summation means for measuring the potential differences occurring between the beginning of each resistance and its associated arm contact, and scales associated with the aforesaid axes of movement of each resistance.

References Cited in the file of this patent

UNITED STATES PATENTS

| | | |
|---|---|---|
| 2,319,322 | Hefel | May 18, 1943 |
| 2,342,710 | Vosseller | Feb. 29, 1944 |
| 2,418,803 | Etherington | Apr. 8, 1947 |
| 2,484,737 | Razek | Oct. 11, 1949 |
| 2,487,590 | Rehill | Nov. 8, 1949 |
| 2,558,430 | Goldberg | June 26, 1951 |
| 2,630,968 | Muskat | Mar. 10, 1953 |
| 2,656,102 | Redheffer | Oct. 20, 1953 |

FOREIGN PATENTS

| | | |
|---|---|---|
| 226,261 | Switzerland | June 16, 1943 |

OTHER REFERENCES

"Graphical Methods of Calculation," by H. L. Seward, article appearing in "Mechanical Engineering," vol. 47, No. 11a (American Society of Mechanical Engineers), November 1925 (pages 1019–1033).

"An Electro-Mechanical Method for Solving Equations," Schooley, RCA Review, vol. III, July 1938, No. 1 (pages 86–96).